United States Patent
Harris et al.

(10) Patent No.: US 9,764,597 B2
(45) Date of Patent: Sep. 19, 2017

(54) AGRICULTURAL TIRE TREAD

(71) Applicant: Bridgestone Americas Tire Operations, LLC, Nashville, TN (US)

(72) Inventors: Bradley J. Harris, New London, OH (US); Todd A. Buxton, Norton, OH (US); Benjamin Robert Rethmel, Doylestown, OH (US)

(73) Assignee: Bridgestone Americas Tires Operations, LLC, Nashville, TN (US)

( * ) Notice: Subject to any disclaimer, the term of this patent is extended or adjusted under 35 U.S.C. 154(b) by 215 days.

(21) Appl. No.: 14/533,604

(22) Filed: Nov. 5, 2014

(65) Prior Publication Data

US 2015/0053318 A1    Feb. 26, 2015

Related U.S. Application Data

(63) Continuation of application No. 13/363,775, filed on Feb. 1, 2012, now Pat. No. 8,905,097.

(51) Int. Cl.
*B60C 11/11* (2006.01)
*B60C 11/03* (2006.01)

(52) U.S. Cl.
CPC ......... *B60C 11/0311* (2013.01); *B60C 11/033* (2013.04); *B60C 11/0327* (2013.04); *B60C 2011/0313* (2013.04); *B60C 2200/08* (2013.04)

(58) Field of Classification Search
CPC ............... B60C 11/0311; B60C 11/033; B60C 2011/0313
See application file for complete search history.

(56) References Cited

U.S. PATENT DOCUMENTS 336,649 A    2/1886   Kelly et al.
344,386 A    6/1886   Lavering et al.
(Continued)

FOREIGN PATENT DOCUMENTS

CN    101868361        10/2010
EP    0600265 A1       6/1994
(Continued)

OTHER PUBLICATIONS

"Understanding basic tire information, metric tire sizes and load ratings." Website [online]. Deere & Company, dated Oct. 2010 [retrieved on Feb. 6, 2014]. Retrieved from the Internet: <URL: http://salesmanual.deere.com/sales/salesmanual/en_NA/tractors/2007/features/wheels_and_tires/8030/8030_understanding_metric_tires.html>.

(Continued)

*Primary Examiner* — Robert Dye

(57) ABSTRACT

An agricultural tire has an equatorial plane separating first and second sides. First and second inner sixths of the treads extend between the equatorial plane and circumferential reference planes disposed axially one-sixth of a tread width on either side of the equatorial plane. First and second middle sixths of the tread extend between inner circumferential planes and middle circumferential reference planes one-sixth of the tread width from the inner circumferential reference planes. Outer sixths extend between the middle circumferential reference planes and outer circumferential reference planes disposed one-sixth of the tread width from the middle planes. Net tread volume ratio is approximately 40 percent, where between 36 and 39 percent of lug volume is in the inner sixths, between 32 to 35 percent in the middle sixths, and 27 to 30 percent in the outer sixths of the tread.

20 Claims, 3 Drawing Sheets

(56) References Cited

U.S. PATENT DOCUMENTS

| | | |
|---|---|---|
| 589,939 A | 9/1897 | Dorr |
| 1,460,247 A | 5/1922 | Johnson |
| D104,492 S | 5/1937 | Brunner |
| D104,503 S | 5/1937 | Partenheimer |
| D108,097 S | 1/1938 | Brunner |
| D141,437 S | 6/1938 | Brunner |
| 2,310,776 A | 2/1943 | Gay |
| 2,474,013 A | 6/1949 | Rawls |
| D155,065 S | 9/1949 | Bete |
| D155,261 S | 9/1949 | Billingsley |
| D155,922 S | 11/1949 | Ofensend |
| D157,118 S | 2/1950 | Anderson |
| D158,031 S | 4/1950 | Wilcox |
| 2,539,617 A | 1/1951 | Gestwick |
| 2,626,649 A | 1/1953 | Eiler et al. |
| D169,668 S | 5/1953 | Hardeman |
| D169,857 S | 6/1953 | Klint |
| D170,710 S | 10/1953 | Nellen |
| D178,114 S | 6/1956 | Davis |
| 2,823,637 A | 2/1958 | Cheramie |
| D184,376 S | 2/1959 | Shively et al. |
| D213,659 S | 3/1969 | Petroff |
| D217,945 S | 6/1970 | Petroff |
| 3,547,175 A | 12/1970 | Verdier |
| D219,799 S | 1/1971 | Sons, Jr. |
| 3,587,703 A | 6/1971 | Hanus |
| 3,603,370 A | 9/1971 | Hylbert et al. |
| 4,131,148 A | 12/1978 | Bertazzoli et al. |
| 4,176,703 A | 12/1979 | Nojima et al. |
| 4,186,788 A | 2/1980 | Pommier |
| D255,674 S | 7/1980 | Menin |
| D256,008 S | 7/1980 | Menin |
| 4,217,943 A | 8/1980 | Tsuzura |
| 4,254,811 A | 3/1981 | Devaux |
| 4,383,567 A | 5/1983 | Crum et al. |
| 4,446,902 A | 5/1984 | Madec et al. |
| 4,480,672 A | 11/1984 | Marshall et al. |
| 4,481,993 A | 11/1984 | Ohnishi |
| D278,045 S | 3/1985 | Oba |
| D278,136 S | 3/1985 | Oba |
| 4,534,392 A | 8/1985 | Bonko et al. |
| 4,611,647 A | 9/1986 | Rimondi |
| D288,425 S | 2/1987 | Beeghly et al. |
| D288,426 S | 2/1987 | Konishi et al. |
| D289,512 S | 4/1987 | Fukuchi |
| D293,093 S | 12/1987 | Nishio et al. |
| 4,711,283 A | 12/1987 | Bonko et al. |
| 4,727,917 A | 3/1988 | Stewart |
| 4,791,971 A | 12/1988 | Shinn |
| D301,219 S | 5/1989 | Igarashi |
| D301,221 S | 5/1989 | Tatsumi |
| D301,707 S | 6/1989 | Igarashi |
| D303,365 S | 9/1989 | Bonko |
| D303,366 S | 9/1989 | Bonko |
| D303,367 S | 9/1989 | Bonko et al. |
| D303,779 S | 10/1989 | Bonko |
| D304,320 S | 10/1989 | Bonko |
| D307,406 S | 4/1990 | Tatsumi |
| D308,038 S | 5/1990 | Guidry |
| D309,125 S | 7/1990 | Bonko et al. |
| D316,386 S | 4/1991 | Fujiki |
| D316,694 S | 5/1991 | Nakasaki |
| D316,695 S | 5/1991 | Fujiki |
| D317,187 S | 5/1991 | Suzuki |
| 5,016,696 A | 5/1991 | Bonko et al. |
| 5,046,541 A | 9/1991 | Bonko |
| 5,056,573 A | 10/1991 | O'Brien et al. |
| D324,013 S | 2/1992 | Marui |
| 5,188,683 A | 2/1993 | Bonko |
| D341,112 S | 11/1993 | Kobayashi et al. |
| 5,259,429 A | 11/1993 | Harms |
| 5,261,475 A | 11/1993 | Yoshino et al. |
| D342,228 S | 12/1993 | Harms |
| D345,950 S | 4/1994 | Guidry |
| D346,993 S | 5/1994 | Bonko et al. |
| 5,318,086 A | 6/1994 | Narumi et al. |
| 5,337,814 A | 8/1994 | Bonko |
| 5,337,816 A | 8/1994 | Bonko et al. |
| 5,375,640 A | 12/1994 | Harms |
| D354,262 S | 1/1995 | Harms |
| 5,421,388 A | 6/1995 | Bonko et al. |
| D360,862 S | 8/1995 | Bonko et al. |
| D362,222 S | 9/1995 | Guspodin et al. |
| D363,906 S | 11/1995 | Bonko et al. |
| D363,907 S | 11/1995 | Bonko |
| 5,464,050 A | 11/1995 | Bonko |
| D370,648 S | 6/1996 | Rooney |
| D377,923 S | 2/1997 | Bonko |
| 5,622,576 A | 4/1997 | Lobb et al. |
| D383,426 S | 9/1997 | Guidry |
| D383,427 S | 9/1997 | Bonko |
| D385,239 S | 10/1997 | Bonko |
| D388,844 S | 1/1998 | Bonko |
| D389,441 S | 1/1998 | Rooney |
| 5,733,394 A | 3/1998 | Baus et al. |
| D400,142 S | 10/1998 | Haas et al. |
| 5,843,248 A | 12/1998 | Baus et al. |
| 5,901,765 A | 5/1999 | Bonko |
| D411,150 S | 6/1999 | Rooney |
| D412,873 S | 8/1999 | Rooney et al. |
| D415,722 S | 10/1999 | Weed et al. |
| 6,021,829 A | 2/2000 | Rooney |
| D425,832 S | 5/2000 | Umstot et al. |
| 6,062,282 A | 5/2000 | Bonko |
| 6,070,633 A | 6/2000 | Rooney et al. |
| D428,586 S | 7/2000 | Rooney |
| D428,587 S | 7/2000 | Maxwell |
| D429,666 S | 8/2000 | Rooney |
| 6,105,643 A | 8/2000 | Rohweder et al. |
| D431,214 S | 9/2000 | Allison |
| 6,145,566 A | 11/2000 | Kliskey |
| 6,179,027 B1 | 1/2001 | Shimizu |
| 6,189,586 B1 | 2/2001 | Guidry |
| 6,209,602 B1 | 4/2001 | Bonko |
| D441,697 S | 5/2001 | Allison |
| D444,110 S | 6/2001 | Umstot et al. |
| 6,260,594 B1 | 7/2001 | Bonko et al. |
| D447,987 S | 9/2001 | Allison |
| 6,293,323 B1 | 9/2001 | Binsfeld |
| 6,298,890 B1 | 10/2001 | Binsfeld |
| 6,357,498 B1 | 3/2002 | Rayman |
| D456,344 S | 4/2002 | Rooney |
| 6,382,284 B1 | 5/2002 | Bonko |
| 6,401,774 B1 | 6/2002 | Rooney |
| D462,935 S | 9/2002 | Maxwell |
| 6,450,221 B1 | 9/2002 | Bonko |
| 6,481,479 B1 | 11/2002 | Weed et al. |
| D471,146 S | 3/2003 | Jackson |
| D472,200 S | 3/2003 | Bonko et al. |
| 6,530,405 B1 | 3/2003 | Brown et al. |
| 6,536,490 B2 | 3/2003 | Rooney |
| D477,808 S | 7/2003 | Bonko et al. |
| 6,598,637 B2 | 7/2003 | Lechtenbohmer et al. |
| D478,039 S | 8/2003 | Bonko et al. |
| D484,088 S | 12/2003 | Kindig |
| 6,655,430 B1 | 12/2003 | Hopkins et al. |
| 6,656,300 B1 | 12/2003 | Cesarini et al. |
| D490,361 S | 5/2004 | Rooney et al. |
| 6,761,196 B2 | 7/2004 | Takubo |
| 6,807,994 B2 | 10/2004 | Westermann et al. |
| D499,065 S | 11/2004 | Shapiro et al. |
| 6,851,462 B2 | 2/2005 | Frank et al. |
| 6,889,735 B2 | 5/2005 | Frank et al. |
| 6,903,150 B2 | 6/2005 | Zimmer et al. |
| D508,673 S | 8/2005 | Dumigan et al. |
| 6,929,044 B1 | 8/2005 | Rooney |
| 6,941,990 B2 | 9/2005 | Rooney |
| 6,945,294 B2 | 9/2005 | Jallais et al. |
| D511,738 S | 11/2005 | Maxwell |
| D512,957 S | 12/2005 | Nishimori |
| D514,501 S | 2/2006 | Nishimori |
| 7,048,023 B2 | 5/2006 | Herberger, Sr. et al. |
| D522,450 S | 6/2006 | Gerasimczuk |
| D524,723 S | 7/2006 | Itoi |

(56) References Cited

U.S. PATENT DOCUMENTS

| | | | |
|---|---|---|---|
| 7,073,550 | B2 | 7/2006 | Reiter et al. |
| 7,091,274 | B2 | 8/2006 | Thielen et al. |
| 7,096,904 | B2 | 8/2006 | Rooney |
| 7,114,539 | B2 | 10/2006 | Townsend |
| 7,128,110 | B2 | 10/2006 | Yamazaki et al. |
| 7,128,113 | B2 | 10/2006 | Nishimori |
| 7,134,467 | B2 | 11/2006 | Neubauer et al. |
| 7,174,936 | B2 | 2/2007 | Becker et al. |
| 7,201,199 | B2 | 4/2007 | Tonezzer et al. |
| D548,674 | S | 8/2007 | Nishimori et al. |
| 7,281,555 | B2 | 10/2007 | Ono |
| D555,578 | S | 11/2007 | Reim |
| D560,156 | S | 1/2008 | Lo |
| 7,350,554 | B1 | 4/2008 | Okrepkie et al. |
| D573,531 | S | 7/2008 | Lee et al. |
| 7,434,605 | B2 | 10/2008 | Vu et al. |
| 7,441,573 | B2 | 10/2008 | Kanz et al. |
| 7,481,960 | B2 | 1/2009 | Ward |
| D589,430 | S | 3/2009 | Guidry |
| 7,503,360 | B2 | 3/2009 | Rielly et al. |
| D595,218 | S | 6/2009 | Rodicq et al. |
| 7,604,031 | B2 | 10/2009 | Zanzig et al. |
| 7,629,409 | B2 | 12/2009 | Kanz et al. |
| 2002/0189733 | A1 | 12/2002 | Rooney |
| 2004/0099359 | A1 | 5/2004 | Bonko |
| 2004/0118497 | A1 | 6/2004 | Bonko et al. |
| 2004/0123926 | A1 | 7/2004 | Rooney |
| 2005/0139302 | A1 | 6/2005 | Reuter et al. |
| 2005/0167020 | A1 | 8/2005 | Rooney |
| 2006/0124215 | A1 | 6/2006 | Vu et al. |
| 2006/0174988 | A1 | 8/2006 | Ferlin |
| 2007/0062625 | A1 | 3/2007 | Koster et al. |
| 2007/0144648 | A1 | 6/2007 | Sinopoli et al. |
| 2007/0187030 | A1 | 8/2007 | Bernard et al. |
| 2007/0277920 | A1 | 12/2007 | Reuter et al. |
| 2008/0073012 | A1 | 3/2008 | Miyazaki |
| 2008/0110541 | A1 | 5/2008 | Sueishi |
| 2008/0110542 | A1 | 5/2008 | Sueishi |
| 2008/0142134 | A1 | 6/2008 | Tedesco |
| 2008/0230162 | A1 | 9/2008 | Piou et al. |
| 2008/0245457 | A1 | 10/2008 | Sueishi |
| 2008/0283167 | A1 | 11/2008 | Matsumura |
| 2008/0283168 | A1 | 11/2008 | Matsumura |
| 2009/0077806 | A1 | 3/2009 | Allen et al. |
| 2009/0084478 | A1 | 4/2009 | Wallet et al. |
| 2009/0107596 | A1 | 4/2009 | Palinkas et al. |
| 2009/0211677 | A1 | 8/2009 | Palinkas et al. |
| 2009/0242091 | A1 | 10/2009 | Puhala et al. |
| 2010/0018625 | A1 | 1/2010 | Imhoff et al. |
| 2010/0032067 | A1 | 2/2010 | Neubauer et al. |
| 2010/0043934 | A1 | 2/2010 | Harvey |
| 2010/0051161 | A1 | 3/2010 | Taylor |
| 2010/0059157 | A1 | 3/2010 | Ashton et al. |

FOREIGN PATENT DOCUMENTS

| | | |
|---|---|---|
| JP | H05155204 A | 6/1993 |
| JP | 2008-024270 | 2/2008 |

OTHER PUBLICATIONS

Han, Joong Sub; International Search Report and Written Opinion; May 14, 2013; pp. 1-8; Korean Intellectual Property Office; Daejeon Metropolitan City, Republic of Korea.

Radial 9000—R-1 W and Radial 9000 Evolution—W, Images, undated, admitted prior art online.

Harris, Bradley J. et al., U.S. Appl. No. 29/412,283, filed Feb. 1, 2012 entitled "Tire Tread".

Office Action in corresponding U.S. Appl. No. 13/363,775, filed Feb. 1, 2012.

Final Office Action in corresponding U.S. Appl. No. 13/363,775, filed Feb. 1, 2012.

European Search Report; Corresponding European Application No. 13744163.0; Oct. 13, 2015.

Search Report; Corresponding Chinese Application No. 2013800073970; Feb. 16, 2016.

Instituto Nacional Da Propriedade Industrial, Office Action in BR302012003856-1, dated Mar. 29, 2017, pp. 1-3, Rio de Janeiro, Brazil.

Chikusui Canycom KK, English_abstract_of_JPH05155204A, dated Jun. 22, 1993.

The article of "Mitas ag tyres raises its profile" on the http://www.fwi.co.uk/Articles/26/12/2011/130719/Mitas-ag-tyres-raises-its-profile.htm, dated on Dec. 26, 2011.

The article of "New Ad 2 Technology From Firestone" on the http://farmprogress.com/story-new-ad-2-technology-from-Firestone-0-34639, dated on Jan. 13, 2010.

AGRICULTURAL TIRE TREAD

CROSS REFERENCE TO RELATED APPLICATIONS

This application is a continuation of U.S. patent application Ser. No. 13/363,775 filed on Feb. 1, 2012, the disclosure of which is incorporated herein by reference in its entirety.

TECHNICAL FIELD

The present disclosure is directed to a tire for agricultural use, and in particular to agricultural tires suitable for use in muddy or loose soil.

BACKGROUND

Agricultural tires often have treads with relatively deep lugs that provide traction in muddy or loose soil conditions where conventional tires would be unable to operate. Such lugs however, are not ideal for travel on hard surfaces such as on paved roads between work sites. Use on such surfaces causes wear that can quickly and undesirably reduce lug depth, thereby rendering the tire less effective in muddy or loose soil conditions.

SUMMARY

A pneumatic agricultural tire has an equatorial plane separating a first side and a second side, the lugs having an R-1W tread depth. First and second inner sixth of the treads tread extend between the equatorial plane and a first circumferential reference planes on disposed axially one-sixth of a tread width from the equatorial plane. First and second middle sixths of the tread extend between inner circumferential reference planes and middle circumferential reference planes disposed axially one-sixth of the tread width from the inner circumferential reference planes. Outer sixths of the tread extend between the middle circumferential reference planes and an outer circumferential reference planes disposed axially one-sixth of the tread width from the middle circumferential reference planes. A net tread volume ratio is approximately 40 percent, where between 36 and 39 percent of a volume of the lugs is in the inner sixths, between 32 to 35 percent in the middle sixths, and 27 to 30 percent in the outer sixths of the tread.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation.

"Circumferential" and "circumferentially" refer to lines or directions extending along the perimeter of the surface of the tread parallel to the equatorial plane perpendicular to the axial direction of the tire.

"Equatorial plane" refers to the plane that is perpendicular to the tire's axis of rotation and passes through the center of the tire's tread.

"Lateral" and "laterally" refer to a direction along the tread of the tire going from one sidewall of the tire to the other sidewall.

"Radial" or "radially" refer to a direction perpendicular to the axis of rotation of the tire.

"Sidewall" refers to that portion of the tire between the tread and the bead.

The terms "inward" and "inwardly" refer to a general direction toward the equatorial plane of the tire, whereas "outward" and "outwardly" refer to a general direction away from the equatorial plane of the tire and toward the sidewall of the tire. Thus, when relative directional terms such as "inner" and "outer" are used in connection with an element, the "inner" element is spaced closer to the equatorial plane of the tire than the "outer" element.

Figure 1:
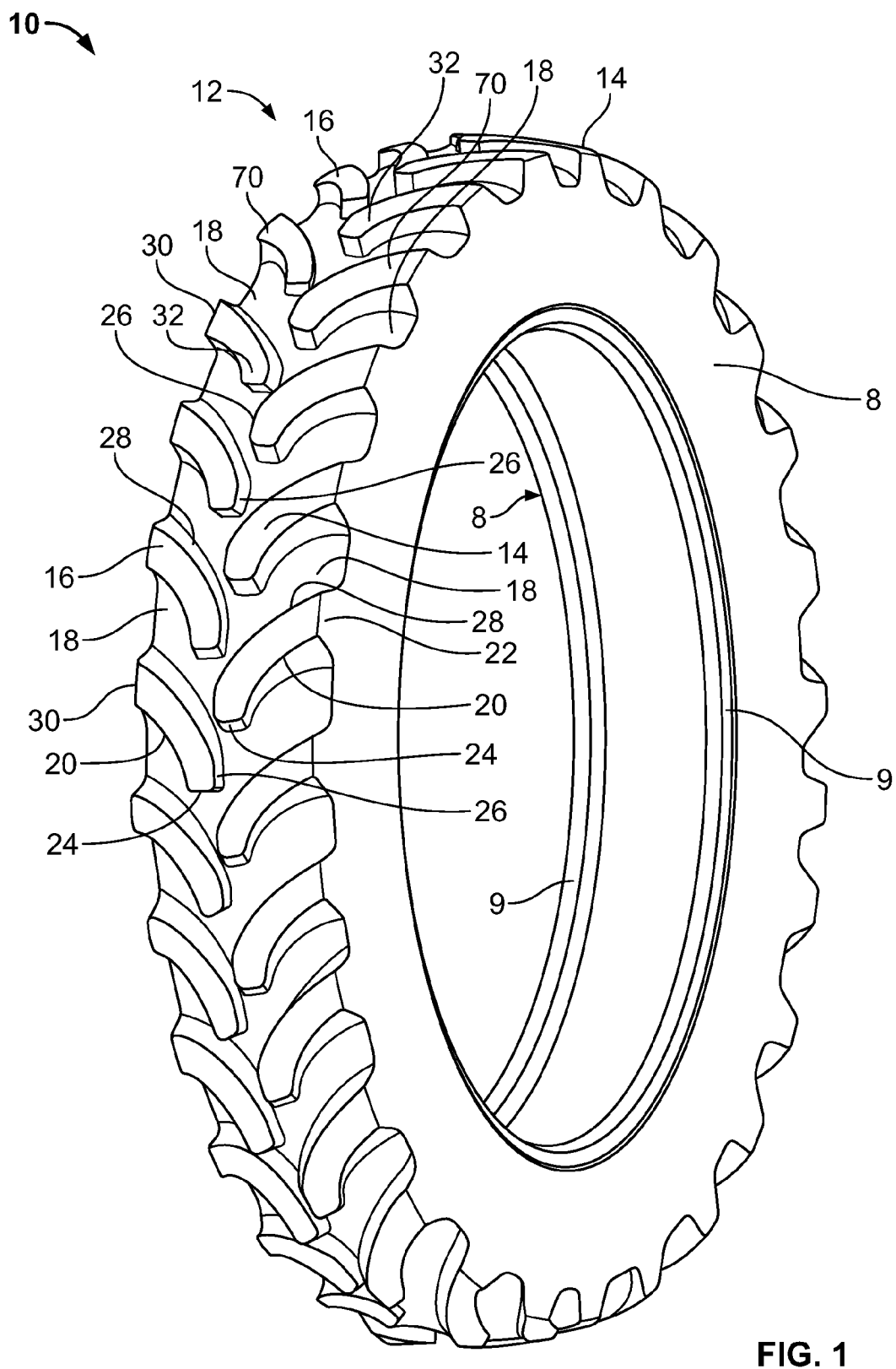
FIG. 1 illustrates a perspective view of a tire according to one example embodiment.

FIG. 1 illustrates a perspective view of an agricultural tire 10 having an exemplary tire tread 12 according to the present disclosure. A pair of sidewalls 8 extend radially inward from tread 12 to a pair of beads 9. As discussed below with respect to FIG. 2, an equatorial plane separates first side 34 and second side 36 of tire 10, with lugs located on the first side denoted first lugs and lugs located on the second side denoted as second lugs. As shown in FIG. 1, first tread lugs 14 and second tread lugs 16 are evenly spaced around the circumference of tire 10 and extend radially outward from an inner tread surface 18. First lugs 14 have an arcuate leading edge 20 that extends from a first lateral tread edge 22 to a leading nose edge 24. As used herein, the term "leading" refers to portions of the lugs that are the first to contact the surface upon which the tire travels, while "trailing" refers to portions of the lug that are the last to leave the surface upon which the tire travels. The leading nose edge 24 extends substantially axially from arcuate leading edge 20 to an inner nose edge 26, which in turn extends substantially circumferentially from leading nose edge 24 to an arcuate trailing edge 28. Arcuate trailing edge 28 extends from inner nose edge 26 to first lateral tread edge 22. Similarly, second tread lugs 16 have an arcuate leading edge 20 that extends from a second lateral tread edge 30 to a leading nose edge 24. Leading nose edge 24 extends substantially axially from arcuate leading edge 20 to an inner nose edge 26, which in turn extends substantially circumferentially from leading nose edge 24 to an arcuate trailing edge 28. Arcuate trailing edge 28 of second lugs 16 extends from inner nose edge 26 to second lateral tread edge 30. Each of first 14 and second lugs 16 has a bar nose 32 at the inward portion of lugs 14, 16.

Figure 2:
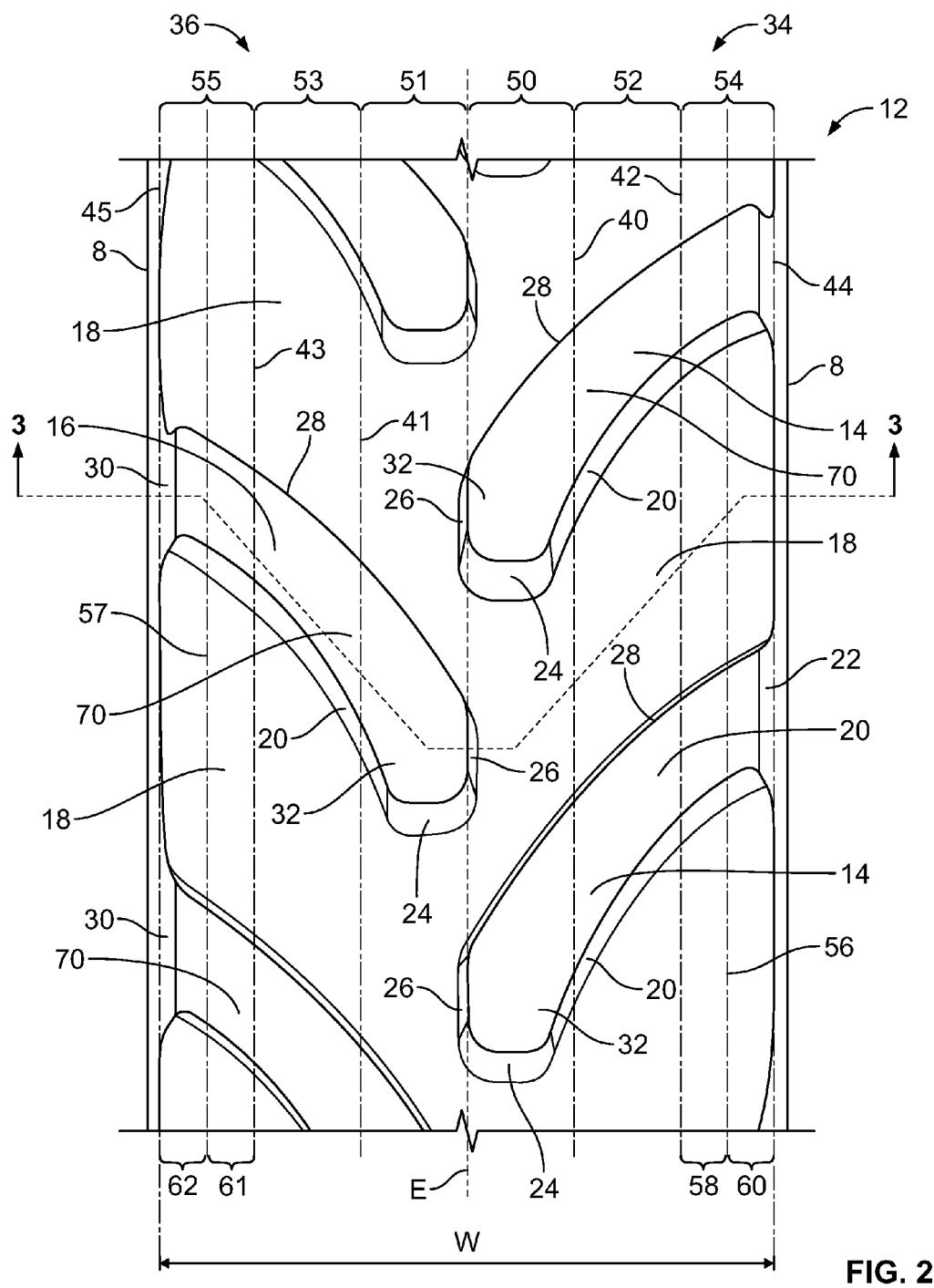
FIG. 2 illustrates a top view of a portion of a tire tread according to one example embodiment.

FIG. 2 is a top view of a portion of an exemplary tire tread 12 shown in FIG. 1. An equatorial plane E separates first side 34 and second side 36 of tire 10. In the preferred embodiment, first 14 and second lugs 16 do not cross equatorial plane E. However, in other embodiments, lugs may cross equatorial plane E. Tread 12 has a width W that extends axially from first lateral treads edge 22 to second lateral tread edge 30. Several circumferential reference planes that are parallel to the circumferential plane are shown in FIG. 2 dividing tread 12 into zones. First inner reference plane 40, first middle reference plane 42 and first outer reference plane 44 are on first side 34 of tire 10, while second inner reference plane 41, second middle reference plane 43 and second outer reference plane 45 are on second side 36 of tire 10.

With continued reference to FIG. 2, first inner reference plane 40 is spaced a distance equal to one-sixth of tread width W from equatorial plane E, and along with equatorial plane E defines a first inner sixth 50 of tread 12. Second inner reference plane 41 is spaced a distance equal to one-sixth of tread width W from equatorial plane E, and along with equatorial plane E defines a second inner sixth 51 of tread 12. First middle reference plane 42 is spaced a distance equal to one-sixth of tread width W from first inner reference plane 40, and together with first inner reference plane 40 defines a first middle sixth 52 of tread 12. Second middle reference plane 43 is spaced a distance equal to one-sixth of tread width W from second inner reference plane 41, and together with second inner reference plane 41 defines a second middle sixth 53 of tread 12. First outer reference plane 44 is spaced a distance equal to one-sixth of tread width W from first middle reference plane 42, and together with first middle reference plane 42 defines a first outer sixth 54 of tread 12. Second outer reference plane 45 is spaced a distance equal to one-sixth of tread width W from second middle reference plane 43, and together with second middle reference plane 43 defines a second outer sixth 55 of tread 12. A first intermediate plane 56 parallel to equatorial plane E is located equidistantly between first middle reference plane 42 and first outer reference plane 44, and defines a first inner twelfth 58 and first outer twelfth 60, each having a width of one-twelfth of tread width W. A second intermediate plane 57 parallel to equatorial plane E is located equidistantly between second middle reference plane 43 and second outer reference plane 45, and defines a second inner twelfth 61 and second outer twelfth 62, each having a width of one-twelfth of tread width W.

Figure 3:
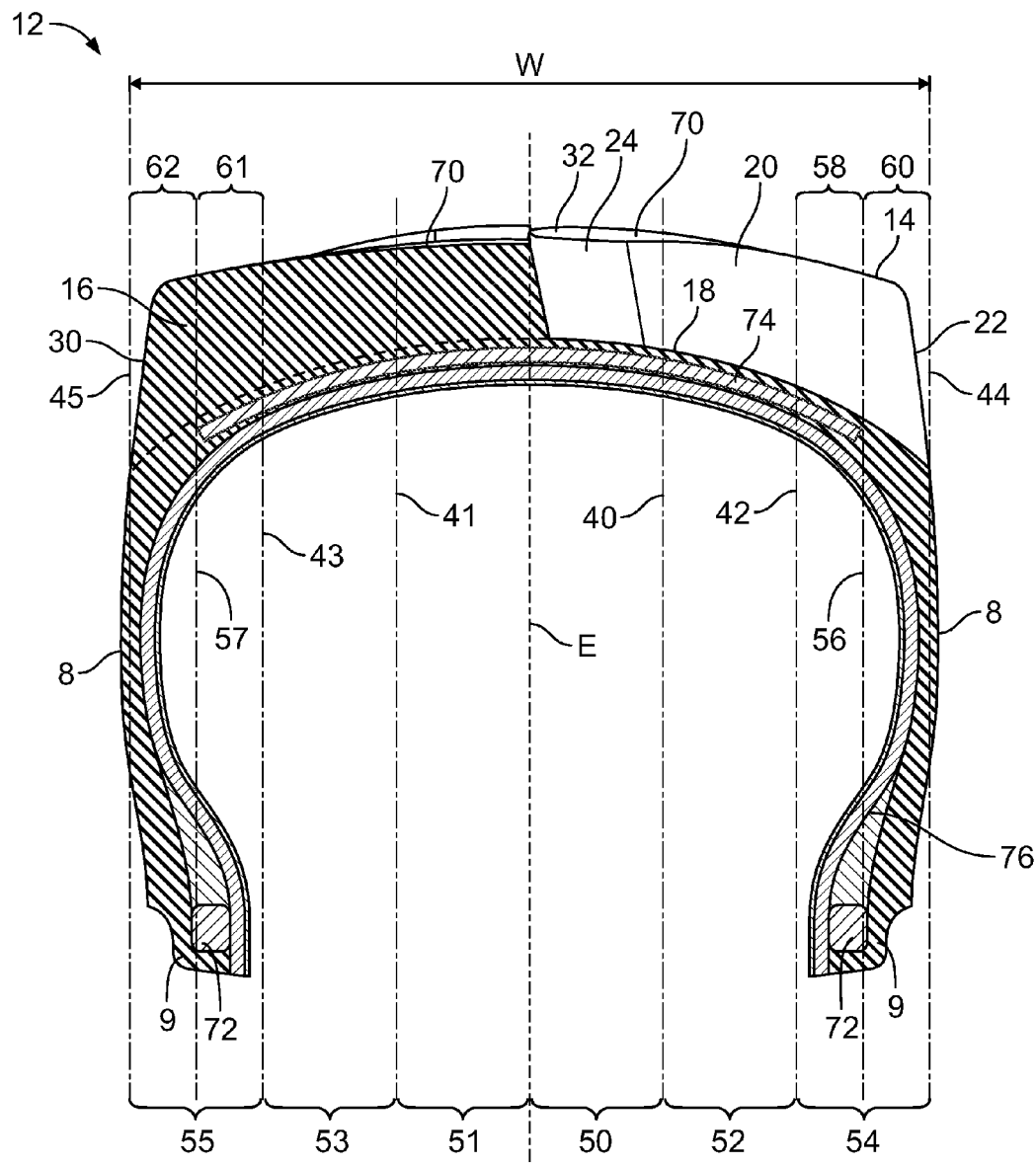
FIG. 3 illustrates a cross sectional view of an exemplary tire tread along the line 3-3 shown in FIG. 2.

FIG. 3 illustrates a cross sectional view of tire 10 along the line 3-3 shown in FIG. 2. A reinforcing belt layer 74, which may include one or more layers of, for example, reinforcing cords, is shown located radially inward relative to tread 12. A carcass ply 76 is partially wrapped around bead cores 72 in a conventional manner. As shown in FIG. 3, first 14 and second lugs 16 extend from inner tread surface 18 to a road contacting surface 70. In the preferred embodiment, first 14 and second lugs 16 have an R-1W rated depth, which is 120 percent of an R-1 rated depth as promulgated by The Tire and Rim Association, Inc. and published, for example, in its 2010 Year Book, incorporated herein by reference. As used herein, the net tread volume ratio is the volume of first 14 and second lugs 16 between inner tread surface 18 and road contacting surface 70, and between first lateral tread edge 22 and second lateral tread edge 30, divided by the volume of an envelope defined by inner tread surface 18, road contacting surface 70, first lateral tread edge 22 and second lateral tread edge 30, rotated about the axis of rotation of tire 10. In the preferred embodiment, the net tread volume ratio is within the range of 38 to 42 percent, and is preferably approximately 40 percent.

With reference to FIGS. 2 and 3, the total relative volume of lugs located in first 50 and second inner sixths 51 is between 36 and 39 percent of the total lug volume of tire 10, and preferably approximately 38 percent of the total lug volume. The total relative volume of lugs located in first 52 and second middle sixths 53 is between 32 and 35 percent of the total lug volume, and preferably approximately 34 percent of the total lug volume. The total relative volume of lugs located in first 54 and second outer sixths 55 is between 27 and 30 percent of the total lug volume, and preferably approximately 28 percent of the total lug volume. In addition, in the illustrated embodiment, between 12 to 14 percent of the total lug volume is in first 58 and second inner twelfths 61 and between 14 to 16 percent of the total lug volume is in first 60 and second outer twelfths 62.

In one preferred embodiment, first 14 and second tread lugs 16 are configured such that upon a reduction of tread volume of 50 percent caused by normal wear conditions, the tread depth will be greater than 46 percent of the original tread depth found on the exemplary tire prior to use. In another embodiment, upon a reduction of tread volume of 50 percent caused by normal wear conditions, the tread depth will be approximately 50 percent of the original tread depth found on the exemplary tire prior to its use.

For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

While the present disclosure illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. A pneumatic agricultural tire having an equatorial plane separating a first side and a second side of the tire, comprising:
   a tread having an inner tread surface;
   first lugs on a first side of the tire extending from a first lateral tread edge toward the equatorial plane, the first lugs having:
      an arcuate leading edge that arcs from the first lateral tread edge to a substantially axial leading nose edge, and
      an arcuate trailing edge that arcs from the first lateral tread edge to a substantially circumferential inner nose edge;

second lugs on the second side of the tire extending from the second lateral tread edge toward the equatorial plane, the second lugs having:
an arcuate leading edge that arcs from the second lateral tread edge to a substantially axial leading nose edge, and
an arcuate trailing edge that arcs from the second lateral tread edge to a substantially circumferential inner nose edge;
a first inner sixth of the tread extending between the equatorial plane and a first inner circumferential reference plane on the first side disposed axially one-sixth of a tread width from the equatorial plane;
a second inner sixth of the tread extending between the equatorial plane and a second inner circumferential reference plane on the second side disposed axially one-sixth of the tread width from the equatorial plane;
a first middle sixth of the tread extending between the first inner circumferential reference plane and a first middle circumferential reference plane on the first side disposed axially one-sixth of the tread width from the first inner circumferential reference plane;
a second middle sixth of the tread extending between the second inner circumferential reference plane and a second middle circumferential reference plane on the second side disposed axially one-sixth of the tread width from the second inner circumferential reference plane;
a first outer sixth of the tread extending between the first middle circumferential reference plane and a first outer circumferential reference plane on the first side disposed axially one-sixth of the tread width from the first middle circumferential reference plane;
a second outer sixth of the tread extending between the second middle circumferential reference plane and a second outer circumferential reference plane on the second side disposed axially one-sixth of the tread width from the second middle circumferential reference plane; and
a net tread volume ratio of the first and second lugs is approximately 40 percent, and between 36 and 39 percent of a volume of the first and second lugs is in the first and second inner sixths of the tread, between 32 to 35 percent of the volume of the first and second lugs is in the first and second middle sixths of the tread; and 27 to 30 percent of the volume of the first and second lugs is in the first and second outer sixths of the tread.

2. The tire of claim 1 wherein approximately 38 percent of the volume of the first and second lugs is in the first and second inner sixths of the tread, approximately 34 percent of the volume of the first and second lugs is in the first and second middle sixths of the tread; and approximately 28 percent of the volume of the first and second lugs is in the first and second outer sixths of the tread.

3. The tire of claim 1 further comprising:
a first inner twelfth and first outer twelfth of the tread, the first inner twelfth disposed between the first middle circumferential reference plane and a first intermediate circumferential reference plane disposed one-twelfth of the tread width from the first middle circumferential reference plane and the first outer circumferential reference plane, the first outer twelfth disposed between the first intermediate circumferential reference plane and first outer circumferential reference plane;
a second inner twelfth and second outer twelfth of the tread, the second inner twelfth disposed between the second middle circumferential reference plane and a second intermediate circumferential reference plane disposed one-twelfth of the tread width from the second middle circumferential reference plane and the second outer circumferential reference plane, the second outer twelfth disposed between the second intermediate circumferential reference plane and second outer circumferential reference plane; and
between 12 to 14 percent of the volume of the first and second lugs is in the first and second inner twelfth and between 14 to 16 percent of volume of the first and second lugs is in the first and second outer twelfth.

4. The tire of claim 3 wherein the first and second lugs are configured such that when a reduction of 50 percent of the volume of the first and second lugs under normal wear conditions occurs, the tread depth will be greater than 46 percent of the original tread depth.

5. The tire of claim 4 wherein the first and second lugs are configured such that when a reduction of 50 percent of the volume of the first and second lugs under normal wear conditions occurs, the tread depth will be approximately 50 percent of the original tread depth.

6. The tire of claim 1 wherein the first and second lugs are configured such that when a reduction of 50 percent of the volume of the first and second lugs under normal wear conditions occurs, the tread depth will be greater than 46 percent of the original tread depth.

7. The tire of claim 6 wherein the first and second lugs are configured such that when a reduction of 50 percent of the volume of the first and second lugs under normal wear conditions occurs, the tread depth will be approximately 50 percent of the original tread depth.

8. A pneumatic agricultural tire having an equatorial plane separating a first side and a second side of the tire, comprising:
a tread having an inner tread surface, first lugs on the first side of the tire extending from a first lateral tread edge toward the equatorial plane and second lugs on the second side of the tire extending from a second lateral tread edge toward the equatorial plane, each of the first and second lugs including an arcuate trailing edge and a lug nose having a leading nose edge extending in a substantially axial direction and an inner nose edge extending in a substantially circumferential direction, wherein the arcuate trailing edge arcs from one of the lateral tread edges to the inner nose edge;
a first inner sixth of the tread extending between the equatorial plane and a first inner circumferential reference plane on the first side disposed axially one-sixth of a tread width from the equatorial plane;
a second inner sixth of the tread extending between the equatorial plane and a second inner circumferential reference plane on the second side disposed axially one-sixth of the tread width from the equatorial plane;
a first middle sixth of the tread extending between the first inner circumferential reference plane and a first middle circumferential reference plane on the first side disposed axially one-sixth of the tread width from the first inner circumferential reference plane;
a second middle sixth of the tread extending between the second inner circumferential reference plane and a second middle circumferential reference plane on the second side disposed axially one-sixth of the tread width from the second inner circumferential reference plane;
a first outer sixth of the tread extending between the first middle circumferential reference plane and a first outer circumferential reference plane on the first side disposed axially one-sixth of the tread width from the first middle circumferential reference plane;

a second outer sixth of the tread extending between the second middle circumferential reference plane and a second outer circumferential reference plane on the second side disposed axially one-sixth of the tread width from the second middle circumferential reference plane;

a net-to-gross volume ratio of the first and second lugs is approximately 40 percent, and between 36 and 39 percent of a volume of the first and second lugs is in the first and second inner sixths of the tread, between 32 to 35 percent of the volume of the first and second lugs is in the first and second middle sixths of the tread; and 27 to 30 percent of the volume of the first and second lugs is in the first and second outer sixths of the tread and wherein the first and second lugs are configured such that when a reduction of 50 percent of the volume of the first and second lugs under normal wear conditions occurs, the tread depth will be greater than 46 percent of the original tread depth.

9. The tire of claim 8 wherein the first and second lugs are configured such that when a reduction of 50 percent of the volume of the first and second lugs under normal wear conditions occurs, the tread depth will be approximately 50 percent of the original tread depth.

10. The tire of claim 8 wherein approximately 38 percent of the volume of the first and second lugs is in the first and second inner sixths of the tread, approximately 34 percent of the volume of the first and second lugs is in the first and second middle sixths of the tread, and approximately 28 percent of the volume of the first and second lugs is in the first and second outer sixths of the tread.

11. The tire of claim 8 further comprising:

a first inner twelfth and first outer twelfth of the tread, the first inner twelfth disposed between the first middle circumferential reference plane and a first intermediate circumferential reference plane disposed one-twelfth of the tread width from the first middle circumferential reference plane and the first outer circumferential reference plane, the first outer twelfth disposed between the first intermediate circumferential reference plane and first outer circumferential reference plane;

a second inner twelfth and second outer twelfth of the tread, the second inner twelfth disposed between the second middle circumferential reference plane and a second intermediate circumferential reference plane disposed one-twelfth of the tread width from the second middle circumferential reference plane and the second outer circumferential reference plane, the second outer twelfth disposed between the second intermediate circumferential reference plane and second outer circumferential reference plane;

between 12 to 14 percent of the volume of the first and second lugs is in the first and second inner twelfth and between 14 to 16 percent of the volume of the first and second lugs is in the first and second outer twelfth.

12. The tire of claim 11 wherein the first and second lugs are configured such that when a reduction of 50 percent of the volume of the first and second lugs under normal wear conditions occurs, the tread depth will be approximately 50 percent of the original tread depth.

13. A pneumatic agricultural tire having an equatorial plane separating a first side and a second side of the tire, comprising:

a tread having an inner tread surface;

first lugs on the first side of the tire extending from a first lateral tread edge toward the equatorial plane,
at least one of the first lugs having a first arcuate leading edge that arcs from the first lateral tread edge to a first leading nose edge,
the first leading nose edge extending substantially axially from the first arcuate leading edge and directly connected to a first inner nose edge,
the first inner nose edge extending substantially circumferentially from the first leading nose edge and directly connected to a first arcuate trailing edge,
the first arcuate trailing edge arcing from the first inner nose edge to the first lateral tread edge;

second lugs on the second side of the tire extending from a second lateral tread edge toward the equatorial plane,
at least one of the second lugs having a second arcuate leading edge that arcs from the second lateral tread edge to a second leading nose edge,
the second leading nose edge extending substantially axially from the second arcuate leading edge and directly connected to a second inner nose edge,
the second inner nose edge extending substantially circumferentially from the second leading nose edge and directly connected to a second arcuate trailing edge,
the second arcuate trailing edge arcing from the second inner nose edge to the second lateral tread edge;

a first inner sixth of the tread extending between the equatorial plane and a first inner circumferential reference plane on the first side disposed axially one-sixth of a tread width from the equatorial plane;

a second inner sixth of the tread extending between the equatorial plane and a second inner circumferential reference plane on the second side disposed axially one-sixth of the tread width from the equatorial plane;

a first middle sixth of the tread extending between the first inner circumferential reference plane and a first middle circumferential reference plane on the first side disposed axially one-sixth of the tread width from the first inner circumferential reference plane;

a second middle sixth of the tread extending between the second inner circumferential reference plane and a second middle circumferential reference plane on the second side disposed axially one-sixth of the tread width from the second inner circumferential reference plane;

a first outer sixth of the tread extending between the first middle circumferential reference plane and a first outer circumferential reference plane on the first side disposed axially one-sixth of the tread width from the first middle circumferential reference plane;

a second outer sixth of the tread extending between the second middle circumferential reference plane and a second outer circumferential reference plane on the second side disposed axially one-sixth of the tread width from the second middle circumferential reference plane; and a net tread volume ratio of the first and second lugs is approximately 40 percent, and between 36 and 39 percent of a volume of the first and second lugs is in the first and second inner sixths of the tread, between 32 to 35 percent of the volume of the first and second lugs is in the first and second middle sixths of the tread; and 27 to 30 percent of the volume of the first and second lugs is in the first and second outer sixths of the tread.

14. The tire of claim 13 wherein approximately 38 percent of the volume of the first and second lugs is in the first and second inner sixths of the tread, approximately 34 percent of the volume of the first and second lugs is in the first and second middle sixths of the tread; and approximately 28 percent of the volume of the first and second lugs is in the first and second outer sixths of the tread.

15. The tire of claim 13 further comprising:
a first inner twelfth and first outer twelfth of the tread, the first inner twelfth disposed between the first middle circumferential reference plane and a first intermediate circumferential reference plane disposed one-twelfth of the tread width from the first middle circumferential reference plane and the first outer circumferential reference plane, the first outer twelfth disposed between the first intermediate circumferential reference plane and first outer circumferential reference plane;
a second inner twelfth and second outer twelfth of the tread, the second inner twelfth disposed between the second middle circumferential reference plane and a second intermediate circumferential reference plane disposed one-twelfth of the tread width from the second middle circumferential reference plane and the second outer circumferential reference plane, the second outer twelfth disposed between the second intermediate circumferential reference plane and second outer circumferential reference plane; and
between 12 to 14 percent of the volume of the first and second lugs is in the first and second inner twelfth and between 14 to 16 percent of the volume of the first and second lugs is in the first and second outer twelfth.

16. The tire of claim 15 wherein the first and second lugs are configured such that when a reduction of 50 percent of the volume of the first and second lugs under normal wear conditions occurs, the tread depth will be greater than 46 percent of the original tread depth.

17. The tire of claim 16 wherein the first and second lugs are configured such that when a reduction of 50 percent of the volume of the first and second lugs under normal wear conditions occurs, the tread depth will be approximately 50 percent of the original tread depth.

18. The tire of claim 13 herein the first and second lugs are configured such that when a reduction of 50 percent of the volume of the first and second lugs under normal wear conditions occurs, the tread depth will be greater than 46 percent of the original tread depth.

19. The tire of claim 18 wherein the first and second lugs are configured such that when a reduction of 50 percent of the volume of the first and second lugs under normal wear conditions occurs, the tread depth will be approximately 50 percent of the original tread depth.

20. The tire of claim 13, wherein none of the first and second lugs cross the equatorial plane.

\* \* \* \* \*